United States Patent [19]
Kluser

[11] Patent Number: 5,632,585
[45] Date of Patent: May 27, 1997

[54] ATTACHMENT MEMBER FOR SECURING PLATES OF CONSIDERABLE THICKNESS TO STRUCTURAL MEMBERS

[75] Inventor: Remo Kluser, Altstätten, Switzerland

[73] Assignee: Hilti Aktiengesellschaft, Schaan, Liechtenstein

[21] Appl. No.: 604,596

[22] Filed: Feb. 21, 1996

[30] Foreign Application Priority Data

Feb. 21, 1995 [DE] Germany .................. 195 05 841.0

[51] Int. Cl.⁶ ........................ F16B 15/00; F16B 15/02
[52] U.S. Cl. ........................ 411/441; 411/480; 411/482
[58] Field of Search ........................ 411/440, 441, 411/480, 482, 531, 533, 544

[56] References Cited

U.S. PATENT DOCUMENTS

| | | |
|---|---|---|
| 3,490,329 | 1/1970 | Pratorius .................. 411/441 |
| 5,054,983 | 10/1991 | Froewis et al. .................. 411/531 X |
| 5,125,616 | 6/1992 | Rothenbuehler et al. .................. 411/441 X |
| 5,171,118 | 12/1992 | Rothenbuhler .................. 411/531 X |
| 5,528,872 | 6/1996 | Rotter .................. 411/441 X |

FOREIGN PATENT DOCUMENTS

| | | |
|---|---|---|
| 0282445 | 2/1988 | European Pat. Off. . |
| 0420799 | 9/1990 | European Pat. Off. . |
| 0628384 | 5/1994 | European Pat. Off. . |
| 2610375 | 1/1987 | France . |
| 1161301 | 12/1966 | United Kingdom . |

*Primary Examiner*—Neill R. Wilson
*Attorney, Agent, or Firm*—Anderson Kill & Olick P.C.

[57] ABSTRACT

An attachment member (1) for securing very thick panels to a receiving material, such as a structural member, is formed of an axially elongated cylindrical shank (2) having a tip (3) at its leading end and a flange-like head (4) projecting laterally outwardly from the shank (2) at its trailing end. A contact pressure element (6) is located in the trailing end region of the shank (2) and is axially displaceable relative to the shank. An axially extending part arranged about the trailing end of the shank is arranged for absorbing excess energy applied to the attachment member. The shank (2) is laterally enclosed by an axially extending cylindrical sleeve (7) extending in the range of approximately ¾ to 9/10 of the axial length of the shank. The sleeve (7) has an outside diameter (a) in the range of 1.4 to 3 times the diameter (s) of the shank (2). The sleeve (7) has a trailing end arranged to axially support the contact pressure element (6).

10 Claims, 2 Drawing Sheets

ATTACHMENT MEMBER FOR SECURING PLATES OF CONSIDERABLE THICKNESS TO STRUCTURAL MEMBERS

BACKGROUND OF THE INVENTION

The present invention is directed to an attachment member for securing plates, in particular insulating material slabs, of considerable thickness to a receiving material, such as structural members, by means of a axially elongated cylindrical shank having a tip at its leading end and a flange like head projecting laterally outwardly from the shank at its trailing end. A contact pressure element for securing the plate or slab is displaceable relative to the trailing end of the shank and an axially extending deformable zone located around the shank for dissipating excess energy used in driving the attachment member into the receiving material.

An attachment member is disclosed in U.S. Pat. No. 5,054,983 having a large area head and a hollow shank with a deformable zone or region along with an abutment for a nail guided in the hollow shank for securing plates, panels or slabs, in particular, plates or slabs of insulating material having a low compression strength. The attachment member is matched to the thickness of the panel of slab of insulating material which has to be secured. The hollow shank is formed of plastics material and has a relatively large diameter along its entire length and, accordingly, it is not easily insertable into all panel materials. In particular, where the panel or slab has a considerable thickness, it can be difficult to insert the attachment member for a sufficient depth so that its leading end contacts the receiving material or structural member. In such cases, it may be necessary to provide the panel with a bore having a diameter corresponding to the diameter of the hollow shaft. The attachment member is inserted into the bore and subsequently nailed to the structural member. This procedure is very time consuming and requires additional tooling for forming the bore.

For securing panels of great thickness, that is, a thickness of 100 mm to 300 mm and more, to structural members, the attachment members are usually provided with nails of great length. The shanks of such nails are relatively thin having a diameter of only approximately 4.5 mm. In the previously described known attachment members, the nails are guided through a central bore in the hollow shaft. When driving the nails into the receiving material, it is possible that the nail shank may buckle when it is driven into hard receiving material or structural members. As a result, the panel or slab may not be adequately fastened to the structural member. To eliminate this problem, additional attachment points have to be provided. The attachment member can tilt into a undesirable position if the nail buckles. In such a situation, the nail has to be removed which is not an easy operation and can lead to damage to the panel or slab.

SUMMARY OF THE INVENTION

Therefore, it is the primary object of the present invention to provide an attachment member for fastening panels, in particular panels of insulating material having a great thickness, to structural members whereby it can be easily inserted into and passed through the panel material, without the need for providing bores in the panel, and where it is assured that the shank of the nail cannot buckle when driven into the structural member.

The solution of these apparently contradictory tasks is achieved by an attachment member including an axially extending cylindrical sleeve laterally enclosing the nail shank and having a length in the range of three-quarters to nine-tenths of the length of the shank as well as an outside diameter in the range of 1.4 to three times the diameter of the shank. The sleeve has a trailing end arranged to support the contact pressure element. The axially extending cylindrical shank has a tip at its leading end and a flange like head at its trailing end extending or projecting laterally outwardly from the shank along with the contact pressure element for holding the panel which is displaceable relative to the shank and a axially deformable zone or region for absorbing excess energy applied for driving the attachment member into the receiving material. The shank is guided in the cylindrical sleeve for approximately three-quarters to nine-tenths of the length of the shank and the sleeve has an outside diameter in the range of approximately 1.4 to three times the diameter of the shank. The sleeve is arranged to support the contact pressure element in the trailing end region of the shank.

The attachment member embodying the invention has a very slender appearance. A mushroom-like widened contact pressure element follows the slender insertion region. To prevent buckling of the very long shank of the nail, required when securing thick panels to a structural member, the shank is guided in a sleeve extending for approximately three-quarters to nine-tenths of the axially length of the shank as well as having an outside diameter of approximately 1.4 to three times the diameter of the shank. The sleeve increases the diameter of the insertion region only slightly, so that the attachment member can be easily inserted along with the sleeve into a thick plate or panel material and can also be easily passed through such material without the need for the formation of preformed bores. In the inserted state the sleeve enclosing the shank is directly imbedded into the panel to be secured. The attachment member of the present invention has no additional hollow shaft extending from the contact pressure element to the leading end of the shaft, which results in a relatively large outside diameter for the known attachment members. The diameter of the insertion region of the attachment member of the present invention is essentially composed only of the sum of the shank diameter of the nail plus twice the wall thickness of the sleeve enclosing the shank. Accordingly, the attachment member has a very slender insertion region. The contact pressure element is disposed only in the trailing end region of the shank of the nail and is axially supported by the sleeve in the trailing end region of the shank. Accordingly, the spacing of the contact pressure element from the leading end of the shank is fixed and the contact pressure element cannot be excessively pressed into the surface of the panel or slab when the attachment member is being secured.

Preferably, the inside diameter of the sleeve is such that the sleeve adheres by a frictional force where such force is proportioned so that the sleeve can still be moved manually relative to the shank. In this way, it is assured that the sleeve cannot drop off the shank. On the other hand, the sleeve can still be moved manually or pulled off the shaft if needed. With the normally used materials for the shank in the sleeve, particularly advantageous values of adhesive friction are obtained, if the inside diameter of the sleeve is in the range of approximately 1.05 to 1.15 times the shank diameter.

Preferably, the wall thickness of the sleeve is in the range of 1 mm to about 4 mm. With such wall thicknesses, the sleeve affords sufficient additional bending stiffness to the long slender shanks required for fastening panels of great thickness, so that buckling of the shanks is prevented when they are driven into a receiving material, such as a structural number. At the same time, the overall diameter of the insertion region of the attachment member is only slightly increased due to such wall thicknesses, whereby the attachment member can be easily inserted through very thick panels or slabs or plates.

In a preferred embodiment of the attachment member, the sleeve is engaged by the contact pressure element at its trailing end region and is retained in a positively locked manner. Thus, the contact pressure element and the sleeve are rigidly connected to one another and form a structural unit. The nail can be displaced relative to the sleeve and to the contact pressure element by the amount projecting beyond the sleeve, for securing the attachment element to the structural member. The spacing of the contact pressure element from the leading end of the sleeve in the secured state is specifically fixed. In this manner, it is possible to utilize an attachment member of an optimum length for the different panel thicknesses by a suitable selection of the axial length of the sleeve.

It is advantageous if the sleeve includes a cylindrical collar extending toward the trailing end, so that it projects beyond the trailing end of the sleeve by approximately 1/7th to about 1/5th of the sleeve length and has a smaller wall thickness then the sleeve. Such a collar, projecting axially from the trailing end of the sleeve, forms a axially extending deformable region and an abutment for the head of the nail during the driving operation. By forming the deformable region as a single piece with the sleeve, no additional plastics dampers or washers are required as abutment members. Preferably, the wall thickness of the cylindrical collar is preferably in the range of approximately half of the wall thickness of the sleeve.

A preferred embodiment of the attachment member of the present invention has a contact pressure element connected to the sleeve in a positively locked manner and comprises an axially extending annular gap between the outside surface of the cylindrical collar and an axially extending wall of the contact pressure element, and such gap serves to receive the mouth portion of an explosive powder charge operated setting tool. This arrangement enables a particularly simple insertion of the attachment member into the mouth portion of the explosive powder charge operated setting tool.

The sleeve along with the cylindrical collar is formed of a high strength or fiber reinforced plastics material or of a metal, particularly steel. The contact pressure element is made of plastics material in a preferred embodiment of the attachment member of the present invention. A steel sleeve can have a particularly small wall thickness if its bending stiffness is satisfactory. By forming the contact pressure element of a plastics material the sleeve, provided with an undercut or circumferential grooves in the trailing end region, can be fabricated by spraying to surround an axial extension of the contact pressure element and achieve a particularly simple but positively locked connection between the sleeve and the contact pressure element.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

DETAILED DESCRIPTION OF THE INVENTION

Figure 1:
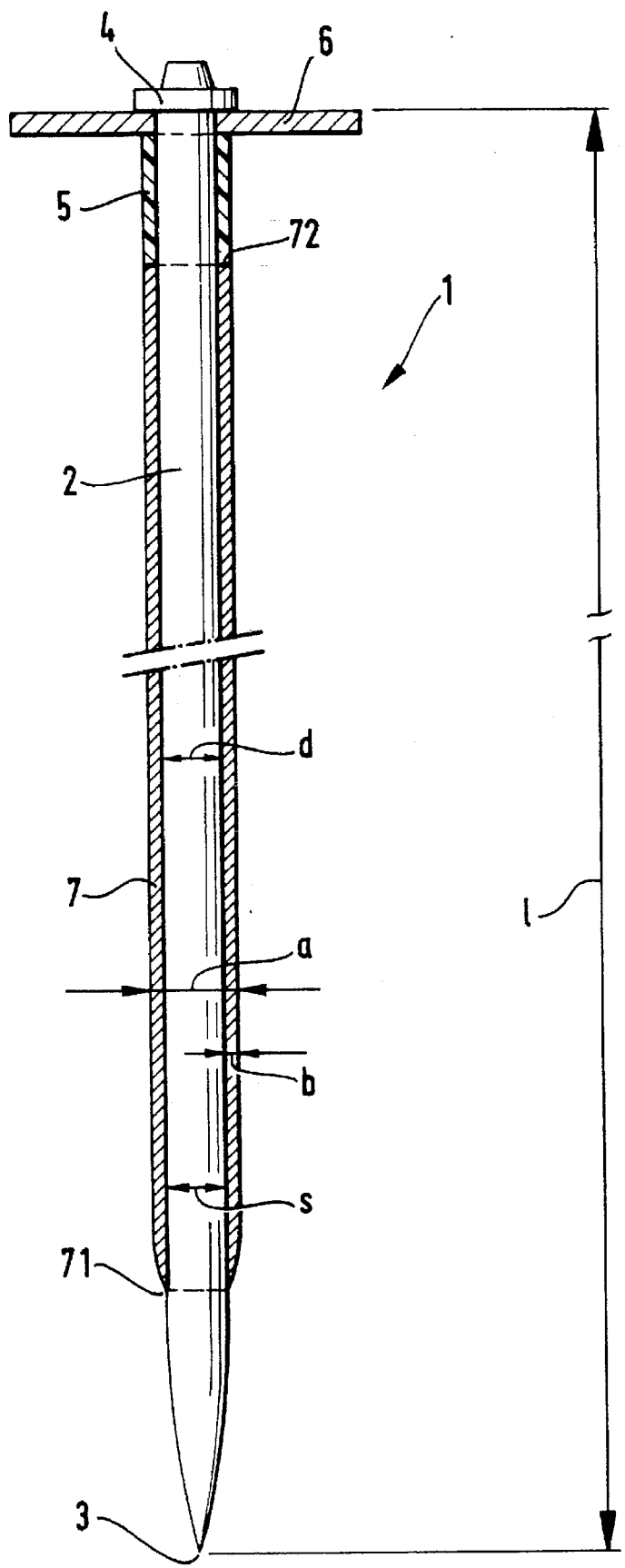
FIG. 1 is a first embodiment of an attachment member in accordance with the present invention shown in axially extending section.

In FIG. 1 an attachment member 1 is shown embodying the present invention. The attachment member includes a nail having an axially elongated cylindrical shank 2 with a pointed tip 3 at its leading end, that is its lower end as viewed in FIG. 1, to be inserted into a receiving material and a flange-like head 4 at its trailing end projecting laterally outwardly from the surface of the shank. Shank 2 has a diameter s which is in the range of 1 to 14 to 1 to 45 of the axial length 1 of the of the shank. As an example, the diameter of the shank 2 is approximately 4 mm to 7 mm. In accordance with the invention, the shank 2 is guided in an axially extending sleeve 7 for approximately for three-quarters to nine-tenths of the length 1 of the shank 2. The outside diameter a of the sleeve 7 is approximately 1.7 to 3 times greater than the diameter s of the shank 2. Sleeve 7 has an inside diameter d only slightly larger than the diameter s of the shank 2. Preferably, the inside diameter of the sleeve 7 is in the range of approximately 1.05 to 1.15 times the diameter s of the shank. The wall thickness b of the sleeve is in the range of approximately 1 mm to about 4 mm.

A contact pressure element 6 for the panel or slab to be secured is located in the region of the flange-like head 4 of the nail. In the embodiment shown in FIG. 1, the contact pressure element is disk-shaped with a central through bore for the shank 2 of the nail. On its leading end side, the contact pressure element 6 abuts an axially extending dampening element 5 formed of a plastics material which, in turn, abuts the trailing end 72 of the sleeve. In this way, the spacing from the contact pressure element 6 to the leading end 71 of the sleeve is fixed. Depending on the driving energy applied to the attachment member, the dampening element forms a deformable region for the attachment element 1 and is upset in the axial direction to a greater or lesser degree. The spacing of the contact pressure element 6 from the leading end 71 of the sleeve corresponds always at least to the length of the sleeve 7.

Figure 2:
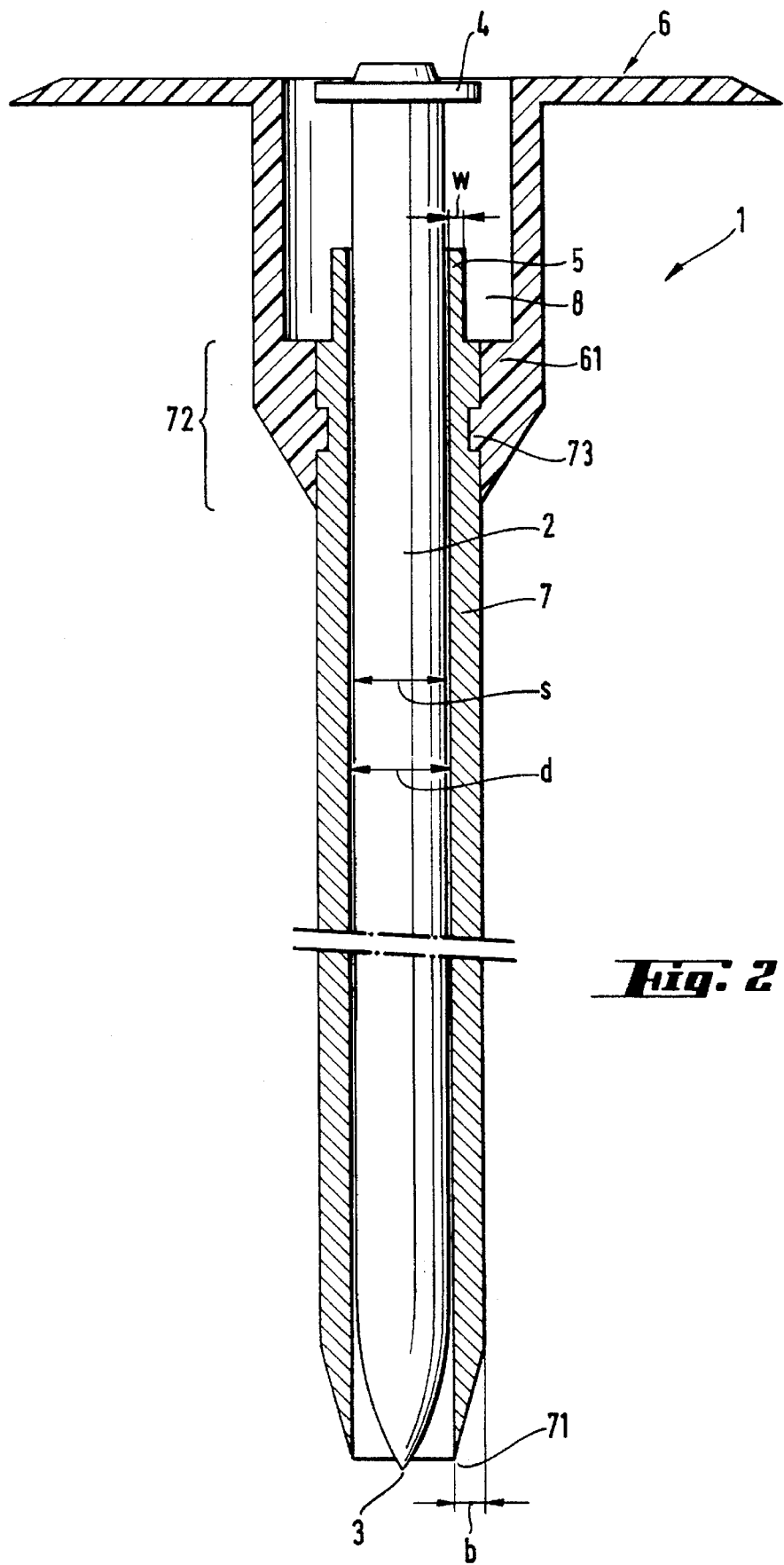
FIG. 2 is a second embodiment of the attachment member in accordance with the present invention and also shown in axial extending section.

In FIG. 2 a second embodiment of the attachment member 1 of the present invention is shown corresponding mainly to the first embodiment shown in FIG. 1. The difference in the two embodiments is in the arrangement of the deformable region 5 and the contact pressure element 6. The deformable region 5 is an axially extending cylindrical collar extending rearwardly from the trailing end section 72 of the sleeve 7. Collar 5 projects rearwardly from the sleeve 7 in the range of 1/7th to 1/5th of the sleeve length and has a wall thickness of about half the wall thickness of the sleeve 7. The inside surface of the collar 5 is aligned with the inside surface of the sleeve 7, accordingly, the outside surface of the collar 5 is stepped inwardly from the outside surface of the sleeve 7. Collar 5 absorbs excess driving energy and forms, at the same time, the axially deformable region and an abutment for the head 4 of the nail.

The contact pressure element 6 has the shape of an open pot or jar with the open end in the region of the nail head 4. At its open end, the pressure element has an annular disk-like extension projecting outwardly from the outside surface of the pot wall. At its leading end, the contact pressure element 6 has an axial extension 61 stepped inwardly towards and in contact with the outside surface of the sleeve 7. In its trailing end region 72, the sleeve 7 is connected in a positively locked manner with the contact pressure element 6, such as by an annular lug projecting inwardly into a groove 73 in the outside surface of the sleeve. The positively locked connection of the contact pressure element 6, formed of a plastics material, with the sleeve 7, preferably formed of metal, can be effected by spray coating. Sleeve 7 is formed of a high strength fiber reinforced plastics material or of a metal, particularly steel.

An axially extending annular gap 8 is formed between the outside surface of the cylindrical collar 5 and the axially extending inside surface of the pot shaped contact pressure element 6. The annular gap 8 serves to receive the mouth region of a explosive powder charge operated setting tool, not shown. This configuration enables a particularly simple insertion of the attachment member into the mouth region of the explosive powder charge operated setting tool.

The attachment member 1 embodying the present invention has a slender configuration and, therefore, poses no problems during its insertion into and passage through very thick panels, such as insulation panels. By the addition of a sleeve extending along a major portion of the length of the nail shank, sufficient bending stiffness is provided for very long and very thin nails and such stiffness prevents such nail from buckling as it is driven into a receiving material. The end position of the contact pressure element is fixed by its abutment against the trailing end of the sleeve. The spacing of the contact pressure element from the receiving material amounts always to at least the length of the sleeve. This arrangement permits matching the length of the attachment member in an optimum manner to the thickness of the panel to be secured.

While specific embodiments of the invention have been shown and described in detail to illustrate the inventive principles, it will be understood that the invention may be embodied otherwise without departing from such principles.

What is claimed is:

1. Attachment member for securing very thick panels to a receiving material, such as a structural member, comprising an axially elongated cylindrical shank (2) having an axial length (1) and a leading end and a trailing end relative to the receiving material, said shank (2) having an outside diameter (s), said shank having a tip (3) at the leading end and a head (4) at the trailing end with said head projecting laterally outwardly from said shank, a contact pressure element (6) located in a trailing end region of said shank, an axially extending part laterally encircling said shank and being axially deformable for absorbing excess driving energy applied to said attachment member, an axially extending cylindrical sleeve (7) separate from said axially extending part and formed of a high strength material closely laterally enclosing said shank (2) for providing bending resistance for said shank and having an axial length in the range of ¾ to 9/10 of the length of said shank (2) and an outside diameter (a) in the range of 1.4 to 3 times the diameter (s) of said shank, said sleeve (7) having a leading end and a trailing end with the trailing end arranged to support said contact pressure element (6).

2. Attachment member, set forth in claim 1, wherein said sleeve (7) having an inside diameter (d) such that said sleeve adheres to said shank (2) with a frictional force, wherein said frictional force permits said sleeve (7) to be displaced manually relative to said shank (2).

3. Attachment member, as set forth in claim 1 or 2, wherein said sleeve (7) has a wall thickness (b) in the range of approximately 1 mm to 4 mm.

4. Attachment member, as set forth in claim 1 or 2, wherein said contact pressure element (6) engages said sleeve (7) in a positively locked manner in an axially extending trailing end region of said sleeve.

5. Attachment member, as set forth in claim 4, wherein said sleeve (7) has an axially extending cylindrical collar (5) extending from the trailing end of said sleeve towards the trailing end of said shank (4) and said collar extends in the range of approximately ⅓th to ⅕th of the length of said sleeve and has a smaller wall thickness (w) than said sleeve and forms an axially extending deformable region and an abutment surface for said head (4).

6. Attachment member, set forth in claim 5, wherein the wall thickness (w) of said cylindrical collar (5) is approximately half of the wall thickness (b) of said sleeve (7).

7. Attachment member, as set forth in claim 5, wherein an axially extending annular gap (8) is formed between said cylindrical collar (5) and an axially extending wall of said contact pressure element (6) and said annular gap being arranged for receiving a mouth region of an explosive powder charge operated setting tool.

8. Attachment member, as set forth in claim 7, wherein said sleeve (7) and said cylindrical collar (5) being formed of one of a high strength and a fiber reinforced plastics material and a metal.

9. Attachment member, as set forth in claim 8, wherein said sleeve (7) and said cylindrical collar (5) is formed of steel.

10. Attachment member, as set forth in claim 8, wherein said contact pressure element (6) is formed of a plastics material.

* * * * *